US012791123B2

(12) United States Patent
Ferris et al.

(10) Patent No.: US 12,791,123 B2
(45) Date of Patent: Nov. 10, 2026

(54) FOOD AND BEVERAGE PIPE BONDING JUMPER KIT

(71) Applicant: ABB Schweiz AG, Baden (CH)

(72) Inventors: Joseph Ferris, Memphis, TN (US); Dustin Bobbitt, Memphis, TN (US)

(73) Assignee: ABB SCHWEIZ AG, Baden (CH)

( * ) Notice: Subject to any disclaimer, the term of this patent is extended or adjusted under 35 U.S.C. 154(b) by 465 days.

(21) Appl. No.: 18/184,626

(22) Filed: Mar. 15, 2023

(65) Prior Publication Data

US 2024/0309972 A1 Sep. 19, 2024

(51) Int. Cl.

*F16L 3/12* (2006.01)
*F16L 3/137* (2006.01)
*H01R 4/38* (2006.01)
*H01R 4/64* (2006.01)
*H01R 4/66* (2006.01)

(52) U.S. Cl.

CPC ............. *F16L 3/1211* (2013.01); *F16L 3/137* (2013.01); *H01R 4/38* (2013.01); *H01R 4/643* (2013.01); *H01R 4/66* (2013.01)

(58) Field of Classification Search

None
See application file for complete search history.

(56) References Cited

U.S. PATENT DOCUMENTS

| | | | | | |
|---|---|---|---|---|---|
| 796,797 | A * | 8/1905 | Blackburn | H01R 4/643 | 439/800 |
| 2,399,899 | A | 5/1946 | Tinnerman | | |
| 4,664,469 | A * | 5/1987 | Sachs | H01R 4/60 | 439/100 |
| 5,314,343 | A | 5/1994 | Englander | | |
| 5,616,036 | A * | 4/1997 | Polidori | H01R 4/60 | 439/100 |
| 6,727,430 | B1 | 4/2004 | Franks, Jr. | | |
| 10,211,565 | B2 * | 2/2019 | Trimborn | H01R 4/34 | |
| 2013/0047409 | A1 | 2/2013 | Booth | | |
| 2021/0278014 | A1 | 9/2021 | Bendlak et al. | | |

* cited by examiner

*Primary Examiner* — Ross N Gushi
(74) *Attorney, Agent, or Firm* — Greenberg Traurig, LLP

(57) ABSTRACT

A device may include a strap member, a tensioning member, a first nut, and a second nut. The strap member includes a first portion, a second portion, and a third portion contiguously connected to the first portion and the second portion. The first nut is coupled to the tensioning member adjacent a first end of the tensioning member. The tensioning member extends through the first nut and contacts a surface of the elongate article to apply a tension force and to electrically connect the elongate article to a grounded electrical conductor. The second nut is coupled to the threaded cylindrical member adjacent a second end and acts on the first nut to retain the position of the tensioning member relative to the first nut. The second nut can also act on a compression lug to place the compression lug in connected engagement with the tensioning member.

20 Claims, 6 Drawing Sheets

FOOD AND BEVERAGE PIPE BONDING JUMPER KIT

FIELD

The present disclosure relates to the field of transfer systems for conveying dry goods. More particularly, for a food and beverage pipe bonding jumper kit.

BACKGROUND

In the food and beverage manufacturing process, pipes or conduits form part of the distribution system that is used to convey dry or liquid materials from a source to a destination. For sanitation purposes, these pipes are typically made of metal and may also be electrically conductive. Consequently, the friction caused by the material passing through the interior channel of the pipe can result in an electrical potential buildup at the metal pipe. Without proper electrical grounding protection, the electrical potential can discharge, thereby causing the material, such as flour, traveling through the metal pipe to ignite or combust. To prevent such occurrences, the metal pipes used in the food and beverage industry and other similar applications typically utilize grounding protection devices that are welded onto the metal pipe. Improved electrical grounding protection devices are desirable.

SUMMARY

In some embodiments, a device includes a strap member, the strap member configured to extend around a circumference of an elongate article. The device includes a cylindrical tensioning member including a first end, and a second end, the tensioning member includes a threaded surface formed on the length of the tensioning member. The device includes a first nut, and a second nut. The tensioning member is configured to extend through the first nut to enable the second end to contact a surface of the elongate article and place the elongate article in electrical connection with the tensioning member, and a position of the tensioning member in the first nut being adjustable in a direction substantially perpendicular to the elongate article to apply a tension force between the strap member and the elongate article. The second nut is located at the first end of the tensioning member and the second nut is configured to act on the first nut to retain a position of the tensioning member in the first nut.

In some embodiments, the device further includes a compression lug located between the first nut and the second nut. The tensioning member extends through the compression lug. The compression lug is connected to a grounded electrical conductor.

In some embodiments, the tensioning member places the elongate article in electrical connection with the compression lug and the grounded electrical connector.

In some embodiments, the second nut applies a compressive force onto the first nut to retain the position of the tensioning member in the first nut.

In some embodiments, the strap member includes a first flange, a second flange, a central portion, a first aperture located on the first flange, a second aperture located on the second flange. The first flange and the second flange extend from opposing ends of the central portion.

In some embodiments, the tensioning member is configured to extend through the first aperture and the second aperture to retain the strap member around the elongate article.

In some embodiments, the second nut applies a compressive force onto the first nut to retain the position of the tensioning member relative to the first nut. The first flange and the second flange are located between the first nut and the second nut.

In some embodiments, the strap member further includes a third aperture located on the second flange adjacent the second aperture. In some embodiments, the threaded cylindrical member is configured to extend through the first aperture and the third aperture to retain the strap member around the elongate article.

In some embodiments, the central portion of the strap member is configured to substantially extend around the circumference of the elongate article until the first flange is in contact with the second flange along adjacent sides.

In some embodiments, the first nut is configured to extend into the first aperture and connect to the first flange by binding to the strap member through mechanical deformation in response to a clamping force applied to the first nut.

In some embodiments, the first nut includes a press nut, or a rivet nut.

In some embodiments, the second nut includes a cap nut.

In some embodiments, the tensioning member includes a set screw.

In some embodiments, a method includes installing a strap member around an elongate article; positioning a tensioning member to extend through a first flange and a second flange of the strap member; installing the tensioning member into a first nut to extend through the first nut and to contact a surface of the elongate article; applying a tension force between the strap member and the elongate article; and installing a second nut onto the tensioning member to enable the second nut to act on the first nut.

In some embodiments, the method further includes attaching the first nut to the first flange by inserting the first nut into a first aperture of the first flange; and applying a clamping force onto the first nut to mechanically deform the first nut in the first aperture.

In some embodiments, positioning a tensioning member to extend through a first flange and a second flange further includes positioning the tensioning member to extend through a first aperture on the first flange and a second aperture on the second flange.

In some embodiments, positioning a tensioning member to extend through a first flange and a second flange further includes positioning the tensioning member to extend through a first aperture on the first flange and a third aperture on the second flange.

In some embodiments, an apparatus includes a strap member including a first flange including a first aperture, a second flange including a second aperture, a central portion, the central portion is configured to substantially extend around a circumference of the elongate article until the first flange is in contact with the second flange along adjacent sides, a cylindrical tensioning member including a first end and a second end and including a threaded surface formed along a length of the tensioning member, a first nut, a cap nut, and the tensioning member is configured to extend through the first nut to enable the second end to contact a surface of the elongate article and place the elongate article in electrical connection with the tensioning member, and a position of the tensioning member in the first nut being adjustable in a direction substantially perpendicular to the elongate article to apply a tension force between the strap member and the elongate article. The cap nut is located at the first end of the tensioning member and the cap nut is configured to act on the first nut to retain a position of the tensioning member in the first nut.

In some embodiments, the tensioning member is configured to extend through the first aperture and the second aperture. The first nut and the cap nut retain the strap member on the tensioning member and around the elongate article.

In some embodiments, the second flange further includes a third aperture located adjacent the second aperture. The tensioning member is configured to extend through the first aperture and the second aperture to retain the strap member on the tensioning member and around the elongate article. A diameter of an opening formed by the strap member is configured to be adjustable based on the tensioning member extending through the second aperture or the third aperture.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
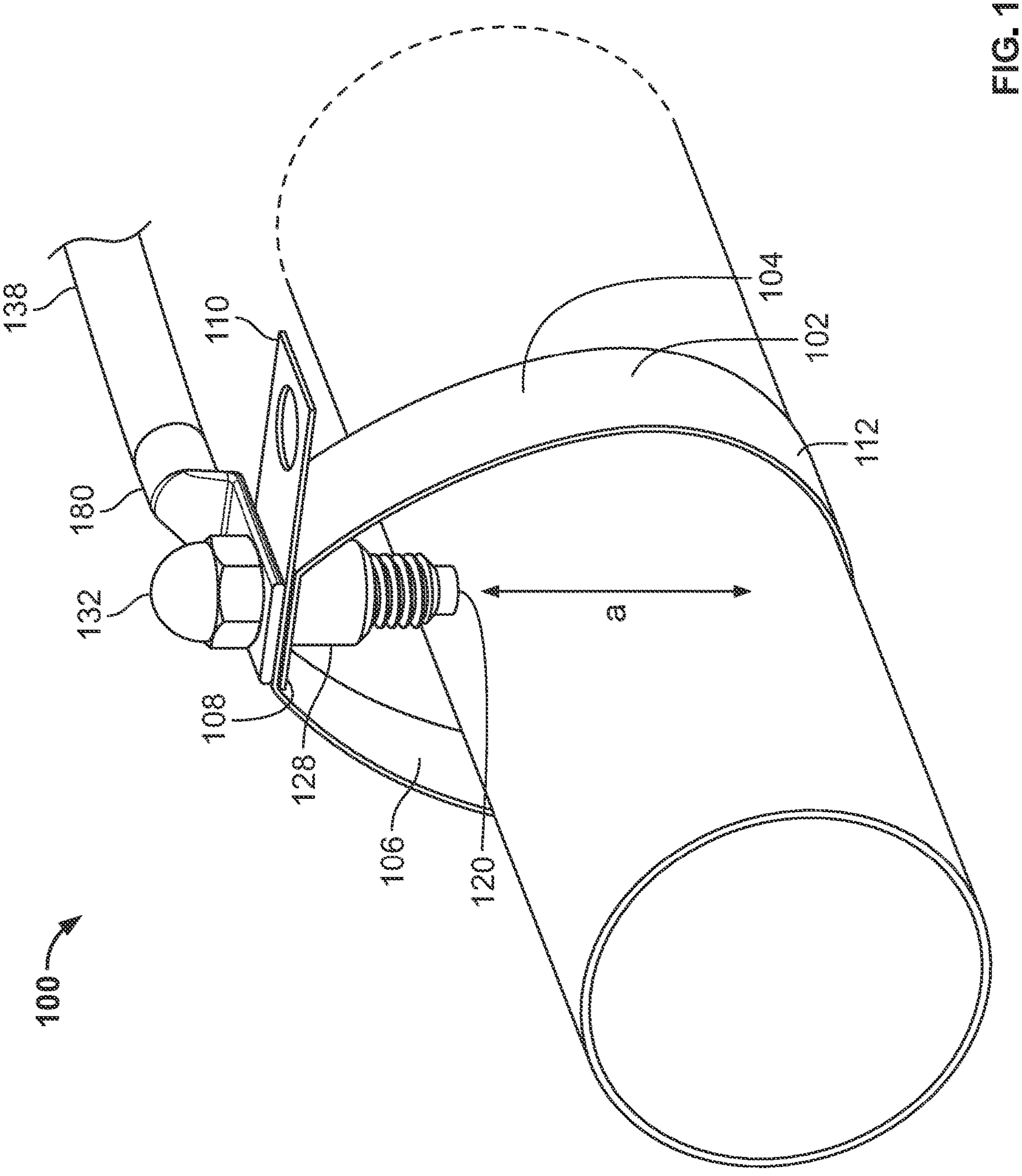
FIG. 1 shows a perspective view of an example device, according to some embodiments.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

As material passes through the channel of an article formed from electrically conductive material, such as metal, the resulting friction may cause a buildup of an electrical discharge potential in the form of electric current at the article. Without adequate grounding protection, the material passing through the article can ignite or combust due to the discharge of the electrical potential, thereby potentially damaging equipment and/or causing injury to personnel. Conventional grounding methods include welding a stud onto an exterior surface of the article and bolting a conductor (e.g., jumper, bonded jumper, etc.) onto the stud. However, this approach requires using specialized tools and equipment (e.g., welding tools) to weld the stud onto the article and also requires specialized permits to perform such work (e.g., hot work permits). In various embodiments, the article is a pipe. In some embodiments, the article is an electrically conductive metallic pipe. As used herein, the term "pipe" refers to an elongated cylindrical conduit having one or more enclosed channels extending through the conduit and used for conveying material, such as a dry flowable material, from a source reservoir.

The present disclosure includes various embodiments of a device, apparatus, system, or kit that includes one or more components adapted for mechanically and electrically connecting to an electrically conductive article. In some embodiments, the article may include a conduit, channel, or other elongate electrically conductive article used to convey materials through the article. Additionally, the device connects the article to one or more grounded electrical conductors, thereby providing grounding protection to the article. The device is adapted to flexibly extend around the article such that the article extends through a central cylindrical opening formed by the device and the device securely attaches to the article by applying a tension force onto the article extending through the opening. The device is also adapted to be installed onto the metal pipe using only hand tools. For example, with a hex wrench or other driver tool. Accordingly, the device may be easily installed onto the article to provide electrical grounding protection without requiring welding tools or requiring permits to install the device onto the article. It is to be understood by those of ordinary skill in the art that the article may include any of a plurality of diameters and profiles suitable for conveying dry materials through an interior channel of the metal pipe. Accordingly, it is also to be understood by those of ordinary skill in the art that the device as described herein in not intended to be limiting any may include any of a plurality of dimensions suitable for being installed onto the article to provide electrical grounding capabilities to the article.

In various embodiments, the device may be made substantially out of metallic materials suitable for providing grounding protection to the article by providing a discharge path for an electrical discharge potential that may build up at the article. In various embodiments, the device may be formed of metallic materials that are also corrosion resistant to prevent the buildup of rust on the device. For example, the device may be subject to a chemical washdown due to cleaning or sanitization procedures in the food manufacturing process where a chlorine bleach solution is applied to the device. In some embodiments, the device may be made of steel. In other embodiments, the device may be made of stainless steel. In some embodiments, the device may also include non-metallic materials. For instance, in some embodiments, the device may include a padding material installed between the article and the strap.

FIG. 1 shows a perspective view of an example device 100, according to some embodiments. The device 100 is adapted to be installed around a circumference of an elongate article and the device 100 applies a tension force onto the article to enable the device to contact a surface of the article, thereby electrically and mechanically connecting the article to a grounded electrical connector and to retain a position of the device 100 along a longitudinal axis of the article. For example, the elongate article in FIG. 1 is a metal pipe.

In various embodiments, the device 100 may include a connector 180. The connector 180 is adapted to be installed onto the device 100. The connector 180 is attached to an electrically grounded electrical conductor or some other grounded component. For example, the connector 180 may be connected to a bonded jumper cable that is in electrical connection with the ground.

The connector 180 includes a flat portion and a barrel portion at an end opposite the flat portion. The flat portion includes an aperture extending through the flat portion. The tensioning member 120 extends through the aperture on the flat portion of the connector 180 between the first nut 128 and the second nut 132. The connector 180 includes an electrical conductor installed at the barrel portion. The electrical conductor places the connector 180 in electrical connection with the ground. The electrical conductor may include any of a plurality of electrical conductors including, but not limited to, cables, jumpers, bonded jumpers, wires, other components, or any combinations thereof suitable for connecting the device 100 and the metal pipe to ground. Additionally, it is to be understood by those of ordinary skill in the art that the conductor may include any of a plurality of sizes and dimensions suitable for being installed onto the tensioning member 120 and for receiving an electrical conductor of suitable gauge to provide grounding protection for electrical current in accordance with this disclosure.

In various embodiments, the connector 180 is installed onto the device 100 between the strap member 102 and the second nut 132 on the tensioning member 120. Therefore, when the second nut 132 acts upon the first nut 128 to apply a compressive force onto the first nut 128, the second nut 132 also applies the compressive force onto the components located therebetween and installed onto the tensioning member 120. Accordingly, in some embodiments, the second nut 132 may also act on the connector 180 retain a position of the connector 180 between the first nut 128 and the second nut 132 and to electrically and mechanically connect the connector 180 with the device 100. Additionally, when the tensioning member 120 contacts the surface of the article, the article is placed in electrical connection with the grounded electrical conductor through the tensioning member 120 and the device 100. Accordingly, the connector 180 facilitates providing grounding protection to the metal pipe by placing the metal pipe in electrical connection with the grounded electrical conductor to provide a discharge path for electrical current that may build up in the metal pipe.

In some embodiments, the electrical conductor may be installed onto the connector 180 by a user where the electrical conductor may be inserted into the receptacle defined by the barrel portion and applying a clamping force onto an exterior of the barrel portion and the electrical conductor to clamp the connector 180 onto the electrical conductor by mechanically deforming the barrel portion (and the electrical conductor) to connect the electrical conductor to the connector 180. This enables the connector 180 to be electrically connected with the electrical conductor, which may then be in electrical connection with the ground or may be connected to another component that is in electrical connection with the ground.

In some embodiments, the connector 180 may be a lug. In some embodiments, the connector 180 may be a compression lug. In other embodiments, the connector 180 may be a mechanical connector. In some embodiments, the connector 180 may include a receptacle to receive the electrical connector and may include a fastening element, such as a set screw, which retains the electrical conductor in the receptacle.

Figure 2:
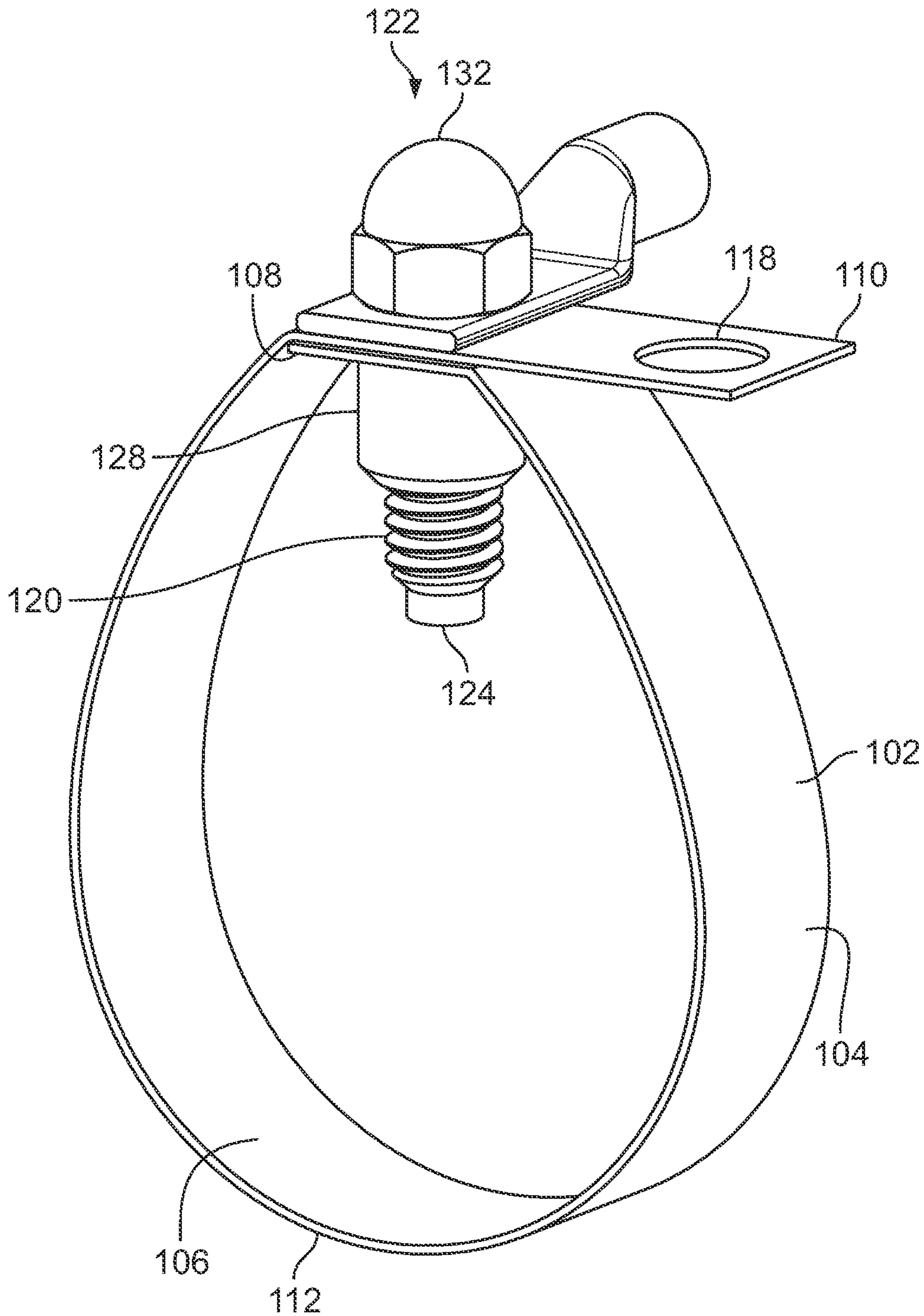
FIG. 2 shows a second perspective view of the device, according to some embodiments.
Figure 3:
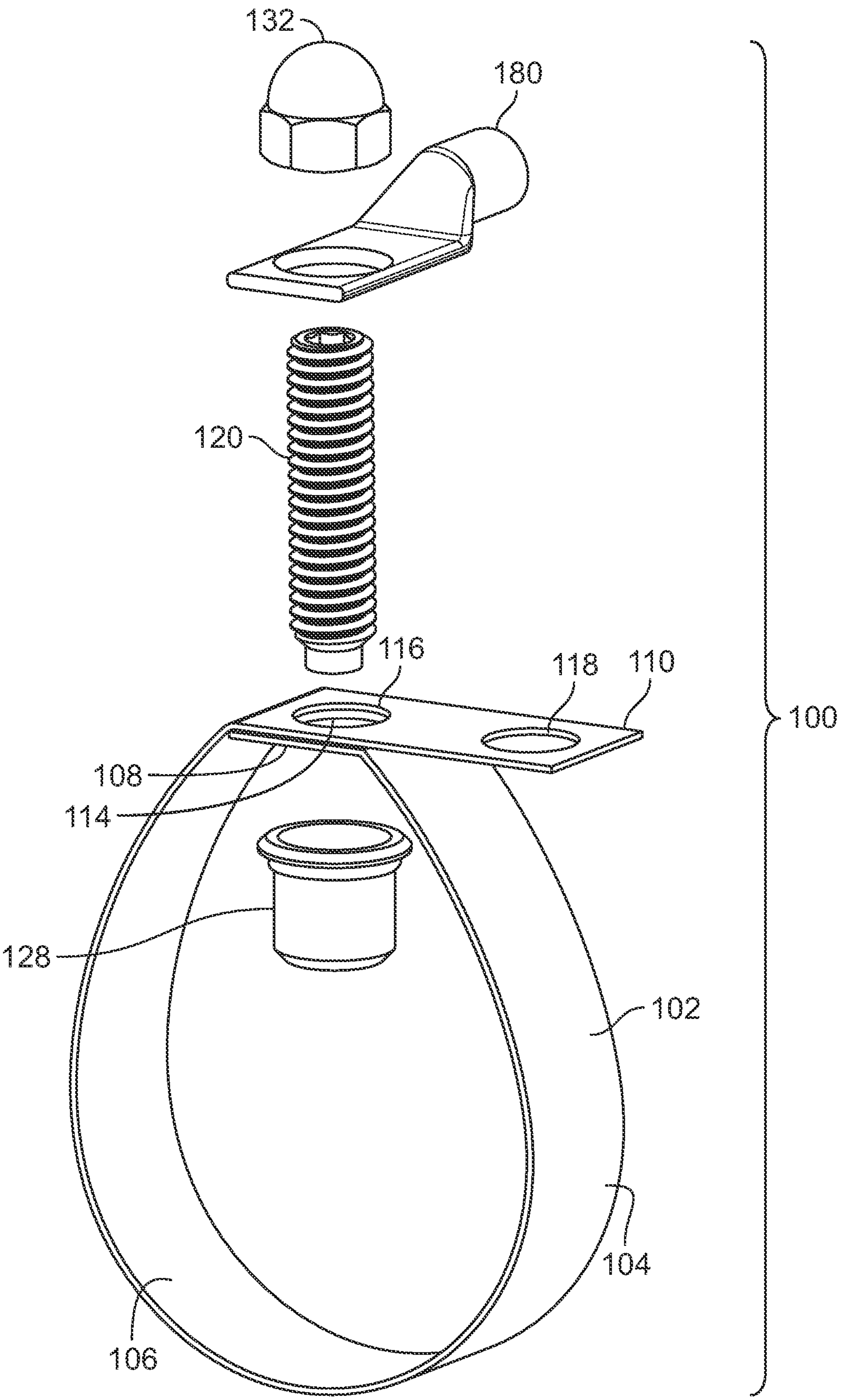
FIG. 3 shows an exploded perspective view of the device, according to some embodiments.

FIG. 2 shows a second perspective view of the device 100 of FIG. 1, according to some embodiments. FIG. 3 shows an exploded perspective view of the device 100 of FIG. 1, according to some embodiments. Unless specifically referenced, FIGS. 1-3 will be described collectively.

The device 100 includes a strap member 102. The strap member 102 is an elongate strap having a first side 104 and a second side 106. Additionally, the strap member 102 includes a first flange 108, a second flange 110, and a central portion 112 extending between, and connected to, each of the first flange 108 and the second flange 110. Therefore, the first flange 108 and the second flange 110 extend from opposing ends of the central portion 112. In some embodiments, the central portion 112 may be an elongate strap portion that is integrally formed with the first flange 108 and the second flange. In other embodiments, the strap member 102 may be formed from one or more segments of strap that are joined together to form the strap member 102. For example, the strap member 102 may include two or more segments that are welded together into an integrally formed strap, but it is to be understood by one of ordinary skill in the art that the segments may be joined together and connected by any of a plurality of other means suitable for forming the strap member 102. In some embodiments, the strap member 102 may be formed from one continuous length of strap material where the ends of the strap are bent to form the first flange 108 and the second flange 110 at opposite ends of the strap, and the central portion 112 being an elongate portion between the first flange 108 and the second flange 110. In some embodiments, the first flange 108 may be referred to as a first portion. In some embodiments, the second flange 110 may be referred to as a second portion. In some embodiments, the central portion 112 may be referred to as a third portion.

Referring to FIG. 3, the strap member 102 includes a first aperture 114 and a second aperture 116 extending therethrough. In some embodiments, the first aperture 114 is located on the first flange 108 and the second aperture 116 is located on the second flange 110. The strap member 102 is adapted to be installed onto the article by extending the central portion 112 around the article and the first flange 108 and the second flange 110 are drawn together from opposing sides of the article and positioned such that the first flange 108 and the second flange 110 are joined together and so that the first flange 108 is in contact with the second flange 110 along adjacent sides. In some embodiments, the strap member 102 is installed onto the article by aligning the first flange 108 and the second flange 110 where the first side 104 of the first flange 108 is in contact with (e.g., abutting) the second side 106 of the second flange 110. In various embodiments, the first flange 108 and the second flange 110 may be drawn together to enable a tensioning member 120 to extend through the first flange 108 and the second flange 110 to install the strap member 102 around the article. For example, the first flange 108 and the second flange 110 may be aligned such that the first aperture 114 and the second aperture 116 are in colinear alignment to enable the tensioning member 120 to be extended therethrough as shown in FIG. 1. Accordingly, the flanges may be loosened or drawn together around the metal pipe and receives the tensioning member 120.

In some embodiments, the strap member 102 may include a third aperture 118. The third aperture 118 is located on the second flange 110 adjacent the second aperture 116. Accordingly, in some embodiments, the first flange 108 and the second flange 110 may be aligned such that the first aperture 114 and the third aperture 118 are in colinear alignment to enable the tensioning member 120 to be extended therethrough.

The first flange 108 includes a first length and the second flange 110 includes a second length. In some embodiments, the first length and the second length may be substantially the same length. In other embodiments, the second flange 110 may be longer than the first flange 108 as the second flange 110 includes a second aperture extending therethrough to enable the strap member 102 to be installed onto articles of varying diameter. In some embodiments, the second flange 110 may include a slot extending therethrough to enable the size of the opening formed by the central portion 112 of the strap member 102 to be adjustable by slidably adjusting the position of the tensioning member 120 in the slot prior to being secured in place by the second nut 132 as will be further discussed herein.

In some embodiments, the strap member 102 may be a flexible elongate strap. In some embodiments, the central portion 112 may be flexibly installed onto the article and where the first flange 108 and the second flange 110 are substantially rigid. In some embodiments, the strap member 102 may be substantially rigid but where the central portion 112 includes adequate flexibility to enable the central portion 112 to be manipulated onto the article while retaining its shape and being resistant to deformation. In various embodiments, the strap member 102 is made of metal. The metal may be stamped and formed into the configuration of the strap member 102 as shown in FIG. 1, but it is to be understood by one of ordinary skill in the art that the embodiments shown in the figures are non-limiting examples and the strap member 102 may include other shapes, dimensions, and features in accordance with this disclosure. For example, a length and width of the strap member 102 may vary based on the dimensions of the article. In other embodiments, the dimensions of the strap member 102 may also be based on the other components of the device 100, such as the size and dimensions of the tensioning member 120. In other embodiments, the length of the central portion may vary. In some embodiments, the strap member 102 may include a certain length and the strap member 102 may be adapted to be installed onto a plurality of articles having various sizes or diameters.

The device 100 includes a tensioning member 120. The tensioning member 120 is defined by a cylindrical body having a first end 122 and a second end 124. The tensioning member 120 includes one or more threads formed on a length of the tensioning member 120. In some embodiments, a portion of the length of the tensioning member 120 may include the one or more threads. In some embodiments, the second end 124 of the tensioning member 120 may include a tapered end. In some embodiments, the second end 124 of the tensioning member 120 may be substantially flat. In other embodiments, the second end 124 may be convex (e.g., rounded). In some embodiments, the tensioning member 120 may include a shank adjacent the first end 122, the shank being substantially smooth and not including the one or more threads.

The tensioning member 120 provides a conductive discharge path for electrical current in the article. Accordingly, the tensioning member 120 is capable of carrying at least 2,450 amps. In some embodiments, the device 100 may be capable of conducting at least 2,450 amps of current. In some embodiments, the device 100 may be capable of conducting more than 2,450 amps of current. In some embodiments, the device 100 may be capable of conducting at least 2,400 amps of current. In some embodiments, the device 100 may be capable of conducting at least 2,300 amps of current. In some embodiments, the device 100 may be capable of conducting at least 2,200 amps of current. In some embodiments, the device 100 may be capable of conducting at least 2,000 amps of current. In some embodiments, the device 100 may be capable of conducting at least 2,500 amps of current. In some embodiments, the device 100 may be capable of conducting at least 2,600 amps of current. In some embodiments, the device 100 may be capable of conducting at least 2,700 amps of current. In some embodiments, the device 100 may be capable of conducting at least 2,800 amps of current. In some embodiments, the device 100 may be capable of conducting at least 2,900 amps of current. In some embodiments, the device 100 may be capable of conducting at least 3,000 amps of current. Additionally, the device 100 is capable of carrying the specified electrical current for a specified period of time and being resistant to cracking, breaking, or melting when subjected to the specified current for the specified period of time. In some embodiments, the device 100 may also be capable of maintaining the metal pipes connection to ground through the device 100 after carrying the specified current for the specified period of time.

The device 100 includes a first nut 128. The first nut 128 is defined by a body and includes a bore 130 extending therethrough. The bore 130 includes one or more threads formed on an inner surface of the bore 130. Additionally, the one or more threads of the bore 130 correspond to the one or more threads on the tensioning member 120 as will be further described herein. Accordingly, the tensioning member 120 is adapted to extend through the strap member 102 and also extends through the first nut 128. In some embodiments, the bore 130 may be referred to as a third bore.

In some embodiments, the first nut 128 may be fixedly attached to the strap member 102. In some embodiments, the first nut 128 may be attached to the strap member 102 at the first flange 108. Accordingly, the first nut 128 may be positioned so that a portion of the first nut 128 extends through the first aperture 114. Specifically, an end of the first nut 128 that is adapted to receive the tensioning member 120 is inserted into the first aperture 114. In this regard, the first nut 128 is positioned such that the body of the first nut 128 is adjacent the second side 106 of the strap member 102 and a portion of the first nut 128 extends through the strap member 102 from the second side 106 and towards the first side 104. Furthermore, a clamping force may then be applied to the first nut 128 to attach the first nut 128 to the strap member 102 at the first aperture 114. The clamping force mechanically deforms the first nut 128 in the first aperture 114, thereby mechanically binding the first nut 128 to the strap member 102 through mechanical deformation, thereby restricting movement of the first nut 128 relative to the strap member 102 in an axial and radial direction in the first aperture 114. In some embodiments, the first nut 128 may be attached to the strap member 102 by a user. In some embodiments, the clamping force may be applied via a clamping tool. In some embodiments, the clamping tool may be a hand clamping tool.

In some embodiments, the first nut 128 may be a lock nut. In some embodiments, the first nut 128 may be a press-fit nut. In other embodiments, the first nut 128 may be a rivet nut. However, it is to be understood that the first nut 128 may be any of a plurality of nuts capable of attaching to the strap member 102 by mechanically binding to the strap member 102 in response to a clamping force. In some embodiments, the bore of the first nut 128 may be referred to as a third bore.

The device 100 includes a second nut 132. The second nut 132 includes a bore 134 that extends into the second nut 132. The bore 134 extends through a portion of the second nut 132. In some embodiments, the bore 134 extends through the second nut 132 from one side of the second nut 132 and out through to the opposite side. In some embodiments, the bore 134 includes one or more threads formed on the inner surface of the bore 134. Additionally, the one or more threads of the bore 134 correspond to the threads on the tensioning member 120. In some embodiments, the bore 134 may be referred to as a second bore.

The second nut 132 is adapted to be installed onto the tensioning member 120 by engaging the one or more threads of the tensioning member 120 at the first end 122 of the tensioning member 120. Accordingly, the second nut 132 is installed onto the tensioning member 120 at an end opposite the first nut 128 when the tensioning member 120 extends through the first nut 128. The second nut 132 threads onto the exposed portion of the tensioning member 120 that extends from first nut 128 and/or the strap member 102 as will be further discussed herein.

The second nut 132 is a cap nut. In some embodiments, the second nut 132 may be an acorn cap nut. In other embodiments, the second nut 132 may be a lock nut. The second nut 132 includes a unique circumferential profile to facilitate threading the second nut 132 onto the tensioning member 120. In some embodiments, the profile can correspond to a hand tool, such as a wrench, for driving the second nut 132 onto the threads of the tensioning member 120. In some embodiments, the second nut 132 may include a hexagonal profile.

Figure 4:
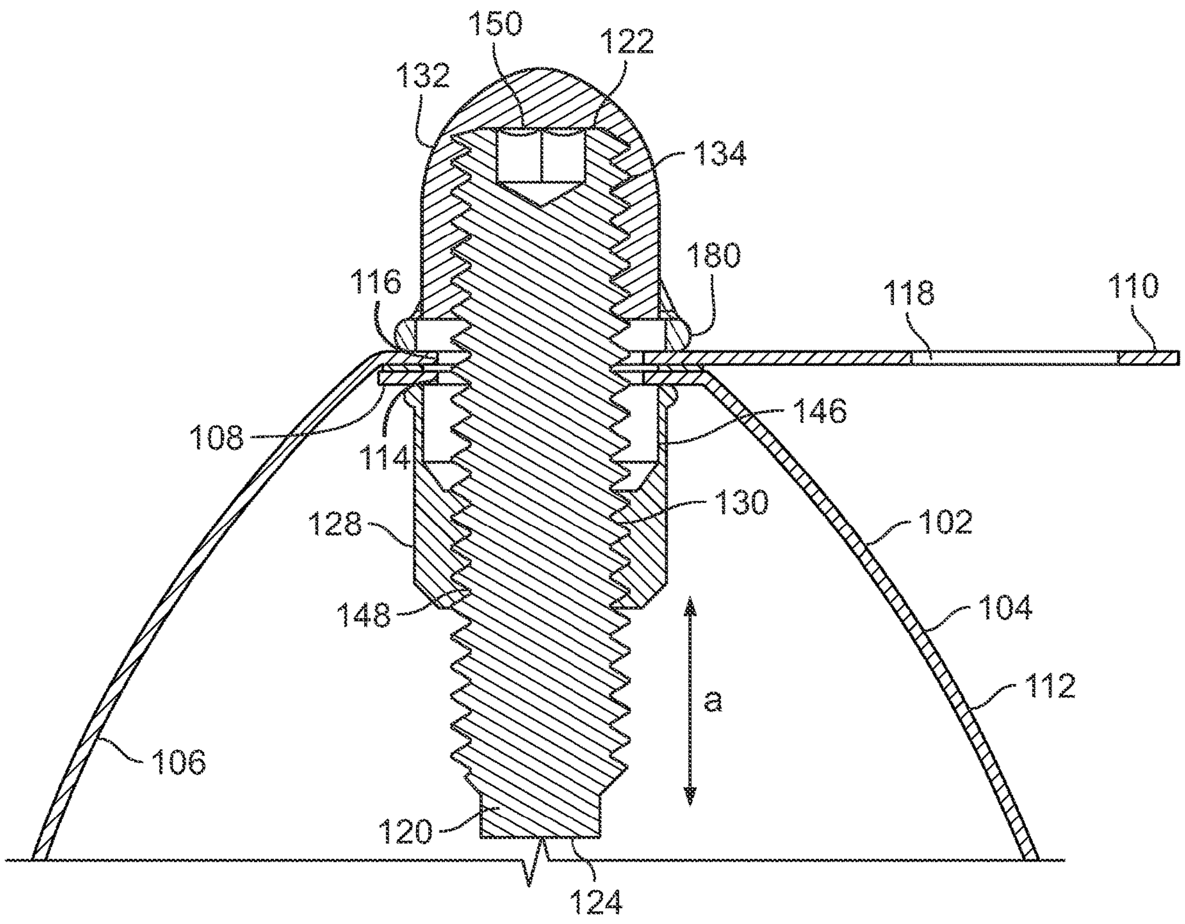
FIG. 4 shows a sectional side view of the device, according to some embodiments.

FIG. 4 shows a sectional side view of the device 100 of FIG. 1, according to some embodiments. The tensioning member 120 is adapted to extend through the first aperture 114 and the second aperture 116 of the strap member 102 and through a first nut 128. The tensioning member 120 engages the threads of the first nut 128 at the bore 130 and extends through the first nut 128. Additionally, the position of the tensioning member 120 relative to the first nut 128 may be adjustable in an axial direction a through the first nut 128 by rotating the tensioning member 120 clockwise or counterclockwise relative to the first nut 128. Accordingly, the threads of the tensioning member 120 engage the threads at the bore 130 of the first nut 128 to enable the tensioning member 120 to couple to the first nut 128 and extend through the first nut 128.

In some embodiments, a portion of the tensioning member 120 at the second end 124 may be substantially smooth. Therefore, a portion of the longitudinal surface of the tensioning member 120 adjacent the second end 124 may not include the one or more threads. The threads terminate prior to the second end. Thus, the second end of the tensioning member 120 that extends from the first nut 128 and/or contacts the surface of the article may be substantially smooth to limit debris or contaminants from accumulating on the exposed portion of the tensioning member 120. Furthermore, it may be advantageous to limit the portion of threads that extend from the first nut 128 and towards the surface of the article to reduce potential contaminant buildup in the threads. In other embodiments, the threads may extend along an entire length of the tensioning member 120 between the second end 124 and the first end 122.

The position of the tensioning member 120 relative to the first nut 128 may be adjustable in the direction a substantially perpendicular to a central longitudinal axis of the article. The position of the tensioning member 120 relative to the first nut 128 may be adjusted to enable the tensioning member 120 to extend towards the article until the second end 124 of the tensioning member 120 contacts a surface of the article. Therefore, by adjusting the position of the tensioning member 120, the tensioning member 120 can extend from the first nut 128 to contact the article and to apply the tension force between the strap member 102 and the article. Applying the tension force between the strap member 102 and the article extending therethrough facilitates connected engagement between the tensioning member 120 and the surface of the article and also facilitates retention of the device on the article.

The tensioning member 120 includes a socket 150 located at the first end 122 of the tensioning member 120. The socket 150 includes a unique profile adapted to receive a driver bit to drive the tensioning member 120 into the first nut 128, and more particularly, to drive the tensioning member 120 into the bore 130. In some embodiments, the socket 150 may include a hexagonal shape adapted to receive a hexagonally shaped tool (e.g., allen key) to drive the tensioning member 120. In other embodiments, the socket 150 may include any of a plurality of other profiles capable of receiving a tool bit capable of driving the tensioning member 120 in and out of the first nut 128 in the axial direction a. Accordingly, the position of the tensioning member 120 relative to the first nut 128 may be adjusted by driving the tensioning member 120 in the direction a using a tool positioned into the socket 150 and being operated by a user to rotate the tensioning member 120. The tensioning member 120 is rotated in the clockwise or counterclockwise direction in the threads of the first nut 128.

The first nut 128 includes the bore 130. In some embodiments, the bore 130 may include a first bore segment 146 having a first diameter and a second bore segment 148 having a second diameter, the first diameter being wider than the second diameter. Additionally, in some embodiments, the second bore segment 148 may include the one or more threads formed on the inner surface of the second section. In some embodiments, the first nut 128 may include one or more threads formed on the inner surface of the bore 130 that corresponds to the one or more threads of the tensioning member 120. In some embodiments, the bore 130 of the first nut 128 may include a consistent diameter as the bore 130 extends through the first nut 128.

The second nut 132 includes the bore 134 that extends at least partway through the second nut 132. The bore 134 of the second nut 132 is configured to be threaded onto the first end 122 of the tensioning member 120 to engage the tensioning member 120 at an first end 122 opposite the first nut 128. The second nut 132 threads onto the tensioning member 120 and acts on the first nut 128 and any components located between the first nut 128 and the second nut 132 along the tensioning member 120. In some embodiments, the second nut 132 applies a compressive force onto the first nut 128 and any components located therebetween on the tensioning member 120. In some embodiments, the second nut 132 may be threaded onto the tensioning member 120 to cover the exposed threads on the tensioning member 120 that extends from the first nut 128 to the first end 122. Additionally, tightening the second nut 132 to act on the first nut 128 also retains the position of the tensioning member 120 relative to the first nut 128, thereby restricting the movement of the tensioning member 120 in the direction a.

In various embodiments, the second nut 132 may be driven onto the first end 122 of the tensioning member 120 until the second nut 132 acts on the first nut 128 and any components located therebetween. Furthermore, driving the second nut 132 onto the tensioning member 120 until the second nut 132 acts on the first nut 128 applies a compressive force onto the first nut 128. In some embodiments, the compressive force may also be applied to the strap member 102 positioned between the first nut 128 and the second nut

132 on the tensioning member 120. In other embodiments, the compressive force may be applied to the first flange 108 and the second flange 110. In some embodiments, the compressive force may also be applied to the connector 180 positioned between the first nut 128 and the second nut 132 adjacent the strap member 102 on the tensioning member 120.

In some embodiments, the size of the opening formed by the central portion 112 of the strap member 102 may be enlarged or narrowed to accommodate articles of varying diameters as will be further discussed herein. It is to be understood by one of ordinary skill in the art that the article may include any of a plurality of sizes and dimensions. Furthermore, it is to be understood by one of ordinary skill in the art that the device 100, including, but not limited to, the strap member 102, the tensioning member 120, the first nut 128, the second nut 132, the connector 180, portions thereof, or any combinations thereof, may include any of a plurality of sizes and dimensions suitable for being installed onto metal pipes of varying dimensions and to provide grounding protection to the metal pipes in accordance with the present disclosure.

In some embodiments, the connector 180 may be located between the first flange 108 and the second flange 110 of the strap member 102 on the tensioning member 120. In other embodiments, the connector 180 may be located between the first nut 128 and the strap member 102. In some embodiments, the flat portion may include one or more prongs that extend around a width of the tensioning member 120.

In various embodiments, the position of the device 100 relative to the central longitudinal axis of the article may be retained by the tensioning applied by the tensioning member 120 onto the article and the strap member 102, where movement of the device 100 is thereby restricted along the longitudinal axis of the article. In various embodiments, the tensioning member 120 may be referred to as a screw, bolt, coupler, jack bolt, or other like members.

Figure 5:
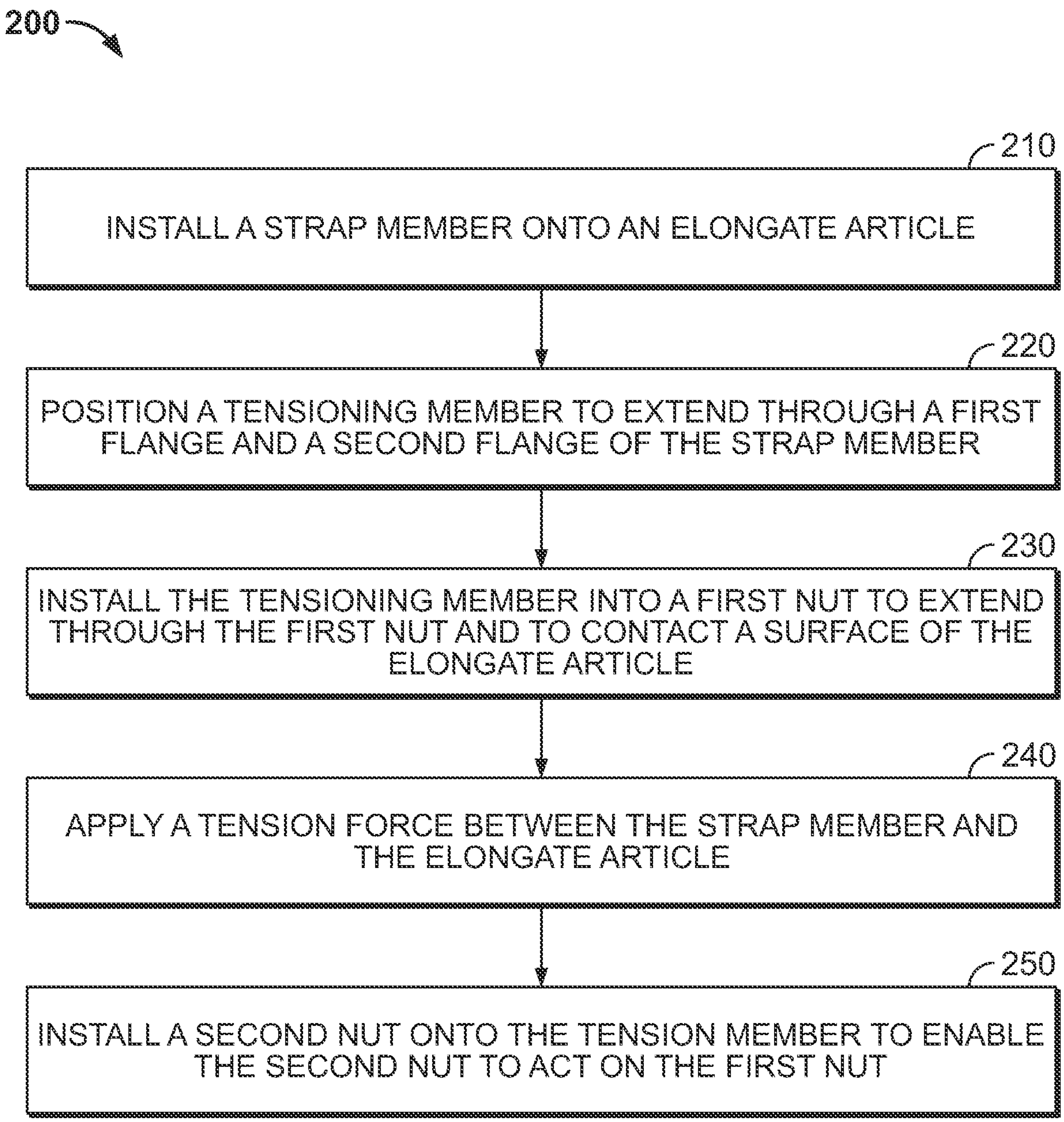
FIG. 5 shows a method of installing the device, according to some embodiments.

FIG. 5 shows a method 200 of installing the device 100 of FIG. 1, according to some embodiments. At 210, the method 200 includes installing a strap member 102 onto an elongate article. In some embodiments, the article is an electrically conductive article, such as a metal pipe. In some embodiments, the strap member 102 is installed around a circumference of the article where a first flange 108 is positioned to slidably contact a second flange 110 along adjacent sides. The first flange 108 and the second flange 110 of the strap member 102 is extended around the outer circumference of the article (e.g., metal pipe) until the first flange 108 meets the second flange 110 from opposing sides of the article.

In some embodiments, installing the strap member 102 to be positioned around a circumference of the article includes manipulating the central portion 112 around the article and drawing the first flange 108 and the second flange 110 together from opposing sides of the article. Additionally, in some embodiments, the first flange 108 and the second flange 110 are drawn together so that a first side 104 of the first flange 108 slidably contacts a second side 106 of the second flange 110, the first flange 108 and the second flange 110 being positioned so that the first aperture 114 and the second aperture 116 are in colinear alignment. Additionally, aligning the first flange 108 and the second flange 110 to enable the first aperture 114 to be in colinear alignment with the second aperture 116 to enable the tensioning member 120 to be inserted through the first aperture 114 and the second aperture 116.

In some embodiments, positioning the strap member 102 around the article includes drawing the first flange 108 and the second flange 110 together so the first flange 108 slidably contacts the second flange 110 and the first aperture 114 is in colinear alignment with the third aperture 118 to enable the first aperture 114 to be inserted through the first aperture 114 and the second aperture 116 of the strap member 102. In some embodiments, positioning the strap member 102 further includes positioning a first flange 108 relative to a second flange 110 so the first side 104 of the first flange 108 abuts the second side 106 of the second flange 110 around the article.

At 220, the method 200 includes positioning a tensioning member 120 to extend through a first flange 108 and a second flange 110 of the strap member 102. Positioning the tensioning member 120 to extend through the strap member 102 enables the strap member 102 to be retained around the article. In some embodiments, positioning the tensioning member 120 includes installing the tensioning member 120 through the first aperture 114 and the second aperture 116 to retain the strap member 102 around the article. In some embodiments, the method 200 includes installing the tensioning member 120 into the first aperture 114 and the third aperture 118.

In some embodiments, the method 200 further includes attaching the first nut 128 to the strap member 102. In some embodiments, attaching the first nut 128 to the strap member 102 includes inserting the first nut 128 through the first aperture 114 to enable a portion of the first nut 128 to extend through the strap member 102 from the second side 106 towards the first side 104. In some embodiments, the method 200 includes applying a clamping force to the first nut 128 to attach the first nut 128 to the strap member 102. In some embodiments, attaching the first nut 128 to the strap member 102 by applying a clamping force onto the first nut 128 mechanically deforms the first nut 128 around a profile of the strap member 102 and the first aperture 114. In some embodiments, the first nut 128 is attached to the strap member 102 in the first aperture 114 using a clamping tool. In some embodiments, the clamping tool may be a hand tool.

At 230, the method 200 includes installing the tensioning member 120 into a first nut 128 to extend through the first nut 128 and to contact a surface of the elongate article. In some embodiments, the tensioning member 120 includes one or more threads formed on an outer surface of the tensioning member 120. Additionally, the first nut 128 includes a bore 130 that includes one or more threads formed on the inner surface that corresponds to the threads on the tensioning member 120. Installing the tensioning member 120 into the first nut 128 includes the threads of the tensioning member 120 threadingly engaging the threads of the bore 130 to enable the tensioning member 120 to extend through the first nut 128 and towards the article extending through the strap member 102.

In some embodiments, the tensioning member 120 includes a socket 150 capable of receiving a hand tool to enable the tensioning member 120 to be rotated relative to the first nut 128. For example, the hand tool may be a hex Allen wrench. In some embodiments, tensioning the tensioning member 120 relative to the first nut 128 includes rotating the tensioning member 120 with a hand tool to apply sufficient tension force onto the metal pipe and the strap member 102 to place the tensioning member 120 in connection with the surface of the metal pipe to provide a discharge path for a buildup of an electrical potential.

At 240, the method 200 includes applying a tension force between the strap member 102 and the elongate article. In some embodiments, the tension force may be applied by adjusting the position of the tensioning member 120 in the direction substantially perpendicular to the longitudinal axis of the article relative to the first nut 128. The tensioning member 120 may be extended through the first flange 108 and the second flange 110, through the first nut 128 and towards the article to tension the article and the strap member 102. The position of the tensioning member 120 relative to the first nut 128 may be adjustable relative to the first nut 128 in a direction to enable the tensioning member 120 to contact a surface of the article and to enable the tensioning member 120 to apply a tension force between the strap member 102 and the article. In some embodiments, adjusting the position of the tensioning member 120 relative to the first nut 128 includes rotating the tensioning member 120 in the clockwise and counterclockwise direction to move the tensioning member 120 in the direction substantially perpendicular to a longitudinal axis of the article. In some embodiments, the method 200 further includes threading the tensioning member 120 into a bore 130 of the first nut 128 until a second end 124 of the tensioning member 120 extends from an end of the first nut 128 opposite the end adjacent the second side 106 of the strap member 102.

At 250, the method 200 includes installing a connector 180 onto the tensioning member 120. In some embodiments, the connector 180 includes a flat portion and a barrel portion. In some embodiments, the flat portion is adapted to connect to the tensioning member 120. In some embodiments, the flat portion includes an aperture extending therethrough. In some embodiments, the barrel portion may be connected to an electrical conductor. In some embodiments, installation of the connector 180 onto the tensioning member 120 includes positioning the connector 180 to enable the tensioning member 120 to extend through the aperture on the flat portion. In some embodiments, installation of the connector 180 onto the tensioning member 120 includes the connector 180 being positioned to contact the first flange 108 and/or the second flange 110 strap member 102. For example, the connector 180 may be positioned in between the first flange 108 and the second flange 110.

At 260, the method 200 includes installing a second nut 132 onto the tensioning member 120 to enable the second nut 132 to act on the first nut 128. The second nut 132 is installed onto the tensioning member 120 at the first end 122 of the tensioning member 120. In some embodiments, the second nut 132 acting upon the first nut 128 also causes the second nut 132 to act upon other components installed onto the tensioning member 120 between first nut 128 and the second nut 132. The second nut 132 applies a compressive force onto the first nut 128 and fixedly retains the members installed onto the tensioning member 120 between the first nut 128 and the second nut 132.

The second nut 132 applying a compressive force on the first nut 128 also retains a position of the tensioning member 120 relative to the first nut 128. In some embodiments, threading the second nut 132 onto the tensioning member 120 includes rotating the second nut 132 in the clockwise and counterclockwise direction to adjust the position of the second nut 132 relative to the tensioning member 120 to enable the second nut 132 to act on the tensioning member 120 and apply the compressive force between the first nut 128 and the second nut 132 to retain the position of the tensioning member 120 relative to the first nut 128. Accordingly, the second nut 132 facilitates the connected engagement of the tensioning member 120 with the surface of the article and facilitates the tension applied to the strap member 102 and the article by the first side 104 to retain the position of the device 100 along the longitudinal axis of the article.

Figure 6:
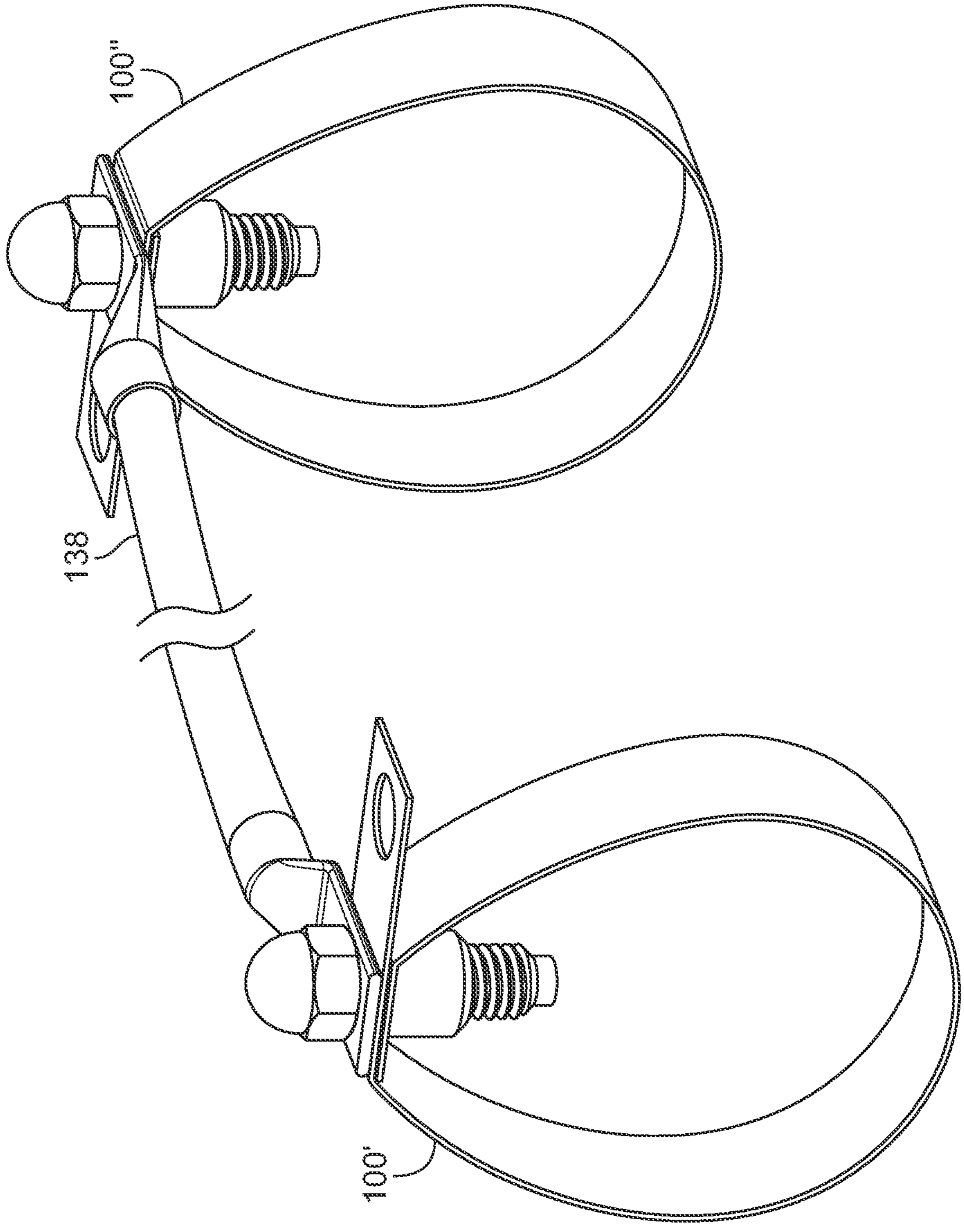
FIG. 6 shows a perspective view of the device, according to some embodiments.

FIG. 6 shows a perspective view of the device 100 of FIG. 1, according to some embodiments. The device 100 is connected to the connector 180. The connector 180 is installed onto the tensioning member 120 between the first nut 128 and the second nut 132 and also connected to an electrical conductor 138 to provide a discharge path for the electrical potential built up in the metal pipe. In the embodiment shown in FIG. 6, the device 100 is electrically connected with device 100" through the electrical conductor 138. In some embodiments, the device 100 and/or the device 100" may be electrically connected with the ground. In other embodiments, the device 100 may also be in electrical connection with one or more of the device 100 in series using one or more of the electrical conductor 138 and in electrical connection with the ground.

In some embodiments, the device 100 may be in electrical connection with any of a plurality of electrical conductors suitable for conducting a specific amount of electrical current to the ground. For example, the electrical conductor may be a bonded electrical jumper capable of carrying at least 2,450 amps of current.

In some embodiments, the device 100 may be installed onto a section of metal pipe. In some embodiments, the metal pipe may be made of one or more sections of metal pipe and each section may include the device 100 installed onto the metal pipe. In some embodiments, a section of metal pipe may include one or more device 100 installed thereon. For example, a particular section may include a first device and a second device installed at opposite ends of the metal pipe section.

In some embodiments, the device 100 may include one or more of the connector 180 installed onto the tensioning member 120. In some embodiments, the device 100 may include a first connector and a second connector installed onto the tensioning member 120. For example, a metal pipe can include a first device, a second device, and a third device installed onto the metal pipe in series and where the third device is also electrically connected to the ground. It is to be understood by one of ordinary skill in the art that a metal pipe may include one or more segments and may include one or more of the device 100 installed thereon. Furthermore, it is to be understood by one of ordinary skill in the art that the device 100 may include one or more of the connector 180 installed thereon to enable the device 100 to be connected to another one of the device 100 in series and/or the ground to provide a discharge path for electrical current to the metal pipe or to enable the device 100 to act as a relay in electrically connecting another device 100 to the ground in accordance with the present disclosure.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or
- any combination(s) thereof.

ASPECTS

Various Aspects are described below. It is to be understood that any one or more of the features recited in the following Aspect(s) can be combined with any one or more other Aspect(s).

Aspect 1. A device comprising: a strap member, the strap member configured to extend around a circumference of an elongate article; a cylindrical tensioning member comprising: a first end, and a second end, wherein the tensioning member includes a threaded surface formed on a length of the tensioning member; a first nut; a second nut; and wherein the tensioning member is configured to extend through the first nut to enable the second end to contact a surface of the elongate article and place the elongate article in electrical connection with the tensioning member, and a position of the tensioning member in the first nut being adjustable in a direction substantially perpendicular to the elongate article to apply a tension force between the strap member and the elongate article; wherein the second nut is located at the first end of the tensioning member and the second nut is configured to act on the first nut to retain a position of the tensioning member in the first nut.

Aspect 2. The device according to aspect 1, further comprising: a compression lug located between the first nut and the second nut; and wherein the tensioning member extends through the compression lug; wherein the compression lug is connected to a grounded electrical conductor.

Aspect 3. The device according to aspect 2, wherein the tensioning member places the elongate article in electrical connection with the compression lug and the grounded electrical conductor.

Aspect 4. The device according to any of the preceding aspects, wherein the second nut applies a compressive force onto the first nut to retain the position of the tensioning member in the first nut.

Aspect 5. The device according to any of the preceding aspects, wherein the strap member comprises: a first flange, a second flange, a central portion, a first aperture located on the first flange, and a second aperture located on the second flange, wherein the first flange and the second flange extend from opposing ends of the central portion.

Aspect 6. The device according to aspect 5, wherein the tensioning member is configured to extend through the first aperture and the second aperture to retain the strap member around the elongate article.

Aspect 7. The device according to aspects 5 or 6, wherein the second nut applies a compressive force onto the first nut to retain the position of the tensioning member relative to the first nut; wherein the first flange and the second flange are located between the first nut and the second nut.

Aspect 8. The device according to aspects 5, 6, or 7, wherein the strap member further comprises: a third aperture located on the second flange adjacent the second aperture, wherein the tensioning member is configured to extend through the first aperture and the third aperture to retain the strap member around the elongate article.

Aspect 9. The device according to aspects 5, 6, 7, or 8, wherein the central portion of the strap member is configured to substantially extend around the circumference of the elongate article until the first flange is in contact with the second flange along adjacent sides.

Aspect 10. The device according to aspects 5, 6, 7, 8, 9, or 10, wherein the first nut is configured to extend into the first aperture and connect to the first flange by binding to the strap member through mechanical deformation in response to a clamping force applied to the first nut.

Aspect 11. The device according to any of the preceding aspects, wherein the first nut comprises: a press nut; or a rivet nut.

Aspect 12. The device according to any of the preceding aspects, wherein the second nut comprises a cap nut.

Aspect 13. The device according to any of the preceding aspects, wherein the tensioning member comprises a set screw.

Aspect 14. A method comprising: installing a strap member around an elongate article; positioning a tensioning member to extend through a first flange and a second flange of the strap member; installing the tensioning member into a first nut to extend through the first nut and to contact a surface of the elongate article; applying a tension force between the strap member and the elongate article; and installing a second nut onto the tensioning member to enable the second nut to act on the first nut.

Aspect 15. The method according to aspect 14, further comprising: attaching the first nut to the first flange by inserting the first nut into a first aperture of the first flange; and applying a clamping force onto the first nut to mechanically deform the first nut in the first aperture.

Aspect 16. The method according to aspects 14 or 15, wherein positioning a tensioning member to extend through a first flange and a second flange further comprises: positioning the tensioning member to extend through a first aperture on the first flange and a second aperture on the second flange.

Aspect 17. The method according to aspects 14, 15, or 16, wherein positioning a tensioning member to extend through a first flange and a second flange further comprises: positioning the tensioning member to extend through a first aperture on the first flange and a third aperture on the second flange.

Aspect 18. An apparatus comprising: a strap member comprising: a first flange comprising: a first aperture, a second flange comprising: a second aperture, and a central portion, wherein the central portion is configured to substantially extend around a circumference of an elongate article until the first flange is in contact with the second flange along adjacent sides; a cylindrical tensioning member comprising a first end and a second end and including a threaded surface formed along a length of the tensioning member; a first nut; a cap nut; and wherein the tensioning member is configured to extend through the first nut to enable the second end to contact a surface of the elongate article and place the elongate article in electrical connection with the tensioning member, and a position of the tensioning member in the first nut being adjustable in a direction substantially perpendicular to the elongate article to apply a tension force between the strap member and the elongate article; wherein the cap nut is located at the first end of the tensioning member and the cap nut is configured to act on the first nut to retain a position of the tensioning member in the first nut.

Aspect 19. The apparatus of aspect 18, wherein the tensioning member is configured to extend through the first aperture and the second aperture; wherein the first nut and the cap nut retain the strap member on the tensioning member and around the elongate article.

Aspect 20. The apparatus of aspects 18 or 19, wherein the second flange further comprises: a third aperture located adjacent the second aperture; and wherein the tensioning member is configured to extend through the first aperture and the second aperture to retain the strap member on the tensioning member and around the elongate article; wherein a diameter of an opening formed by the strap member is configured to be adjustable based on the tensioning member extending through the second aperture or the third aperture.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A device comprising:
- a strap member,
  - wherein the strap member configured to extend around a circumference of an elongate article;
- a cylindrical tensioning member comprising:
  - a first end,
  - a second end, and
  - a socket disposed at the first end, the socket comprising a profile configured to receive a driving tool for driving the tensioning member in an axial direction,
  - wherein the tensioning member includes a threaded surface formed on a length of the tensioning member;
- a first nut comprising a first threaded bore extending through the first nut;
- a second nut comprising a second threaded bore extending partway through the second nut; and
- wherein the tensioning member is configured to, with the second nut removed from the first end, be driven using the driving tool received in the socket so as to extend through the first nut by threading into the first threaded bore of the first nut to enable the second end to directly contact a surface of the elongate article and place the elongate article in electrical connection with the tensioning member, and a position of the tensioning member in the first nut being adjustable in a direction substantially perpendicular to the elongate article to apply a tension force between the strap member and the elongate article by threading the tensioning member in a respective axial direction in the first threaded bore by driving the tensioning member in the respective axial direction using the driving tool;
- wherein the tensioning member is configured to only extend partway through the second nut by threading into the second threaded bore of the second nut, the second nut configured to be installed onto the first end of the tensioning member to act on the first nut to retain a position of the tensioning member relative to the first nut.

2. The device according to claim 1, further comprising:
- a compression lug located between the first nut and the second nut; and
- wherein the tensioning member extends through the compression lug;
- wherein the compression lug is connected to a grounded electrical conductor.

3. The device according to claim 2, wherein the tensioning member places the elongate article in electrical connection with the compression lug and the grounded electrical conductor.

4. The device according to claim 1, wherein the second nut applies a compressive force onto the first nut to retain the position of the tensioning member in the first nut.

5. The device according to claim 1, wherein the strap member comprises:
- a first flange,
- a second flange,
- a central portion,
- a first aperture located on the first flange, and
- a second aperture located on the second flange,
- wherein the first flange and the second flange extend from opposing ends of the central portion.

6. The device according to claim 5, wherein the tensioning member is configured to extend through the first aperture and the second aperture to retain the strap member around the elongate article.

7. The device according to claim 5, wherein the second nut applies a compressive force onto the first nut to retain the position of the tensioning member relative to the first nut;
- wherein the first flange and the second flange are located between the first nut and the second nut.

8. The device according to claim 5, wherein the strap member further comprises:
- a third aperture located on the second flange adjacent the second aperture,
- wherein the tensioning member is configured to extend through the first aperture and the third aperture to retain the strap member around the elongate article.

9. The device according to claim 5, wherein the central portion of the strap member is configured to substantially extend around the circumference of the elongate article until the first flange is in contact with the second flange along adjacent sides.

10. The device according to claim 5, wherein the first nut further comprising:
- one or more threads formed on an inner surface of the first threaded bore extending through the first nut, wherein one or more threads of the threaded surface of the tensioning member engages the one or more threads of the first nut.

11. The device according to claim 1, wherein the first nut comprises:

a press nut; or a rivet nut.

12. The device according to claim 1, wherein the second nut comprises a cap nut.

13. The device according to claim 1, wherein the tensioning member comprises a set screw.

14. A method comprising:

installing a strap member around an elongate article;

positioning a tensioning member to extend through a first flange and a second flange of the strap member;

installing the tensioning member into a first nut to extend through a first threaded bore of the first nut and to directly contact a surface of the elongate article, the tensioning member being installed into the first nut by driving the tensioning member in a respective axial direction using a driving tool received in a socket located at a first end of the tensioning member;

applying a tension force between the strap member and the elongate article, the tensioning member comprising a threaded surface that engages the threads of the first threaded bore, and a position of the tensioning member relative to the first nut is adjustable by threading the tensioning member through the first threaded bore in a respective direction such that a second end of the tensioning member applies the tension force; and installing a second nut onto the tensioning member to enable the second nut to act on the first nut, the tensioning member only extending partway through a second threaded bore of the second nut by threading a first end of the tensioning member into the second threaded bore.

15. The method according to claim 14, further comprising:

attaching the first nut to the first flange by inserting the first nut into a first aperture of the first flange; and applying a clamping force onto the first nut to mechanically deform the first nut in the first aperture.

16. The method according to claim 14, wherein positioning the tensioning member to extend through the first flange and the second flange further comprises:

positioning the tensioning member to extend through a first aperture on the first flange and a second aperture on the second flange.

17. The method according to claim 14, wherein positioning the tensioning member to extend through the first flange and the second flange further comprises:

positioning the tensioning member to extend through a first aperture on the first flange and a third aperture on the second flange.

18. An apparatus comprising:

a strap member comprising:

a first flange comprising:

a first aperture, a second flange comprising:

a second aperture, and a central portion, wherein the central portion is configured to substantially extend around a circumference of an elongate article until the first flange is in contact with the second flange along adjacent sides;

a cylindrical tensioning member comprising a first end and a second end and including a threaded surface formed along a length of the tensioning member;

a first nut comprising a first threaded bore extending therethrough;

a cap nut comprising a second threaded bore extending partway through the cap nut; and a socket disposed at the first end, the socket comprising a profile configured to receive a driving tool for driving the tensioning member in an axial direction, wherein the tensioning member is configured to, with the second nut removed from the first end, be driven using the driving tool received in the socket so as to extend through the first nut by threading into the first threaded bore to enable the second end to directly contact a surface of the elongate article and place the elongate article in electrical connection with the tensioning member, and a position of the tensioning member in the first nut being adjustable in a direction substantially perpendicular to the elongate article to apply a tension force between the strap member and the elongate article by threading the tensioning member in a respective axial direction in the first threaded bore using the driving tool;

wherein the tensioning member is configured to only extend partway through the second threaded bore by threading the first end of the tensioning member into the second threaded bore, the cap nut is configured to be located at the first end of the tensioning member and the cap nut is configured to act on the first nut to retain a position of the tensioning member relative to the first nut.

19. The apparatus of claim 18, wherein the tensioning member is configured to extend through the first aperture and the second aperture;

wherein the first nut and the cap nut retain the strap member on the tensioning member and around the elongate article.

20. The apparatus of claim 19, wherein the second flange further comprises:

a third aperture located adjacent the second aperture; and wherein the tensioning member is configured to extend through the first aperture and the second aperture to retain the strap member on the tensioning member and around the elongate article;

wherein a diameter of an opening formed by the strap member is configured to be adjustable based on the tensioning member extending through the second aperture or the third aperture.

* * * * *